United States Patent
Zhang et al.

(10) Patent No.: US 12,228,760 B2
(45) Date of Patent: Feb. 18, 2025

(54) TRIM FOR VEHICLE AND GLASS ASSEMBLY

(71) Applicant: Fujian Fuyao Automotive Aluminium System Co., Ltd., Fujian (CN)

(72) Inventors: Fuhui Zhang, Fujian (CN); Yusheng Yu, Fujian (CN); Peng Wang, Fujian (CN); Zhizhen Wang, Fujian (CN)

(73) Assignee: FUJIAN FUYAO AUTOMOTIVE ALUMINIUM SYSTEM CO., LTD., Fujian (CN)

( * ) Notice: Subject to any disclaimer, the term of this patent is extended or adjusted under 35 U.S.C. 154(b) by 0 days.

(21) Appl. No.: 18/284,739

(22) PCT Filed: Mar. 24, 2022

(86) PCT No.: PCT/CN2022/082723
§ 371 (c)(1),
(2) Date: Sep. 28, 2023

(87) PCT Pub. No.: WO2022/206540
PCT Pub. Date: Oct. 6, 2022

(65) Prior Publication Data
US 2024/0168213 A1 May 23, 2024

(30) Foreign Application Priority Data

Mar. 30, 2021 (CN) .......................... 202110340699.6
Mar. 30, 2021 (CN) .......................... 202120647440.1

(51) Int. Cl.
*F21V 8/00* (2006.01)
*B60J 1/10* (2006.01)
(Continued)

(52) U.S. Cl.
CPC .............. *G02B 6/0006* (2013.01); *B60J 1/10* (2013.01); *B60Q 1/50* (2013.01); *B60Q 3/62* (2017.02); *B60R 13/02* (2013.01); *B60R 13/04* (2013.01)

(58) Field of Classification Search
None
See application file for complete search history.

(56) References Cited

U.S. PATENT DOCUMENTS

| 4,494,326 A | 1/1985 | Kanamori |
| 5,583,394 A | 12/1996 | Burbank et al. |

(Continued)

FOREIGN PATENT DOCUMENTS

| CN | 202986845 U | 6/2013 |
| CN | 109803855 A | 5/2019 |

(Continued)

OTHER PUBLICATIONS

International Search Report dated Jun. 29, 2022 issued in PCT/CN2022/082723.

(Continued)

*Primary Examiner* — Ashok Patel
(74) *Attorney, Agent, or Firm* — Scully, Scott, Murphy & Presser, P.C.

(57) ABSTRACT

A trim for a vehicle and a glass assembly are provided. The trim includes a trim body, a flexible light emitter, and a light-transmitting member. The trim body has an inner surface and an outer surface opposite to the inner surface, and the flexible light emitter is attached to the inner surface. The trim body defines multiple light-transmitting through holes, and the multiple light-transmitting through holes extend through the inner surface and the outer surface and form a light-emitting region on the outer surface of the trim body. The light-transmitting member is located between the (Continued)

trim body and the flexible light emitter and is configured to generate a light effect in the light-emitting region. The flexible light emitter is configured to generate light that exits through the light-transmitting member and the multiple light-transmitting through holes.

16 Claims, 7 Drawing Sheets

(51) Int. Cl.
*B60Q 1/50* (2006.01)
*B60Q 3/62* (2017.01)
*B60R 13/02* (2006.01)
*B60R 13/04* (2006.01)

(56) References Cited

U.S. PATENT DOCUMENTS

| | | | |
|---|---|---|---|
| 8,395,319 | B2 | 3/2013 | Tchakarov et al. |
| 2004/0128882 | A1 | 7/2004 | Glass |
| 2008/0101080 | A1 | 5/2008 | Hein |
| 2008/0315612 | A1 | 12/2008 | D'Alessandro |
| 2012/0327673 | A1* | 12/2012 | Ureta Hortiguela ..... B60Q 3/74 362/490 |
| 2015/0185391 | A1 | 7/2015 | Englert |
| 2015/0273092 | A1 | 10/2015 | Holub et al. |

FOREIGN PATENT DOCUMENTS

| | | |
|---|---|---|
| CN | 210283007 U | 4/2020 |
| CN | 211107242 U | 7/2020 |
| CN | 112172702 A | 1/2021 |
| CN | 212373289 U | 1/2021 |
| DE | 102011082344 A1 | 3/2013 |
| DE | 102012101314 A1 | 8/2013 |
| DE | 102018130738 A1 | 6/2020 |
| EP | 1371051 B1 | 12/2009 |
| FR | 3076780 A1 | 7/2019 |
| JP | 861297120 A | 12/1986 |

OTHER PUBLICATIONS

Extended European search report dated Jun. 27, 2024 received in European Patent Application No. 22778723.1.
First Office Action dated Sep. 14, 2024 received in Chinese Patent Application No. 202110340699.6.

* cited by examiner

A-A

TRIM FOR VEHICLE AND GLASS ASSEMBLY

This application is a National Stage of International Application No. PCT/CN2022/082723, filed Mar. 24, 2022, which claims priority to Chinese Patent Application No. 202110340699.6, filed Mar. 30, 2021, and Chinese Patent Application No. 202120647440.1, filed Mar. 30, 2021, the entire disclosures of which are hereby incorporated by reference.

TECHNICAL FIELD

This disclosure relates to the field of vehicle components, and in particular to a trim for a vehicle and a glass assembly.

BACKGROUND

At present, light-emitting structures of metal exterior trims in mainstream motor vehicles are composed of light-emitting source and light guide plates or light guide bodies and are arranged inside the metal trims. Light-emitting of the metal exterior trim is achieved by defining openings/slots in the metal exterior trim.

However, the light-emitting structure of the existing metal exterior trim has the following defects. 1. Since the light source, and the light guide plate or the light guide body need to be integrated inside the metal exterior trim, the requirements for the internal space of the metal exterior trim are relatively high. In practical applications, the internal space of the metal exterior trim is often affected by the internal structure or functionality of the product itself, resulting in high difficulty in the design of integrating a light source circuit and the light guide body, and the precision of fit between the existing metal exterior trim and the light guide plate or the light guide body is not high, resulting in a poor light-emitting effect. 2. Since the light guide body or the light guide plate may be embedded in the openings or slots of the metal trim, there is a relatively high requirement for the precision of fit between the light guide body and light-transmitting holes/slots of the metal trim (if there is a small gap between the light guide body and the light-transmitting hole/slot, an assembly operation may be affected or the light guide body may be crushed, and if there is a large gap between the light guide body and the light-transmitting hole/slot, the overall appearance of the metal exterior trim may be affected).

SUMMARY

A trim for a vehicle is provided in the present disclosure. The trim includes a trim body, a flexible light emitter, and a light-transmitting member. The trim body has an inner surface and an outer surface opposite to the inner surface, and the flexible light emitter is attached to the inner surface. The trim body defines multiple light-transmitting through holes, and the multiple light-transmitting through holes extend through the inner surface and the outer surface and form a light-emitting region on the outer surface. The light-transmitting member is located between the trim body and the flexible light emitter. The flexible light emitter is configured to generate light that exits through the light-transmitting member and the multiple light-transmitting through holes.

A glass assembly is further provided in the present disclosure. The glass assembly includes a trim. The trim includes a trim body, a flexible light emitter, and a light-transmitting member. The trim body has an inner surface and an outer surface opposite to the inner surface, and the flexible light emitter is attached to the inner surface. The trim body defines multiple light-transmitting through holes, and the multiple light-transmitting through holes extend through the inner surface and the outer surface and form a light-emitting region on the outer surface. The light-transmitting member is located between the trim body and the flexible light emitter. The flexible light emitter is configured to generate light that exits through the light-transmitting member and the multiple light-transmitting through holes.

BRIEF DESCRIPTION OF THE DRAWINGS

To describe the technical solutions in embodiments of the present disclosure more clearly, the accompanying drawings for use in the embodiments are briefly described. Apparently, the accompanying drawings in the following description show merely some embodiments of the present disclosure, and persons of ordinary skill in the art may obtain other drawings from these accompanying drawings without involving any inventive effort.

LIST OF REFERENCE SIGNS

100—trim; 1—trim body; 11—light-transmitting through hole; 12—light-emitting region; 13—light guide recess; 101—inner surface; 102—outer surface; 2—flexible light emitter; 21—first polyethylene terephthalate (PET) protective layer; 22—transparent conductive layer; 23—light-emitting layer; 24—insulating layer; 25—conductive dielectric layer; 26—second PET protective layer; 27—cable; 3—light-transmitting member; 31—light-transmitting member body; 32—extension portion; 4—adhesive.

DETAILED DESCRIPTION

In order to explain the technical contents, achieved objectives and effects of the present disclosure in detail, the following description will be given in conjunction with embodiments and the accompanying drawings.

Figure 2:
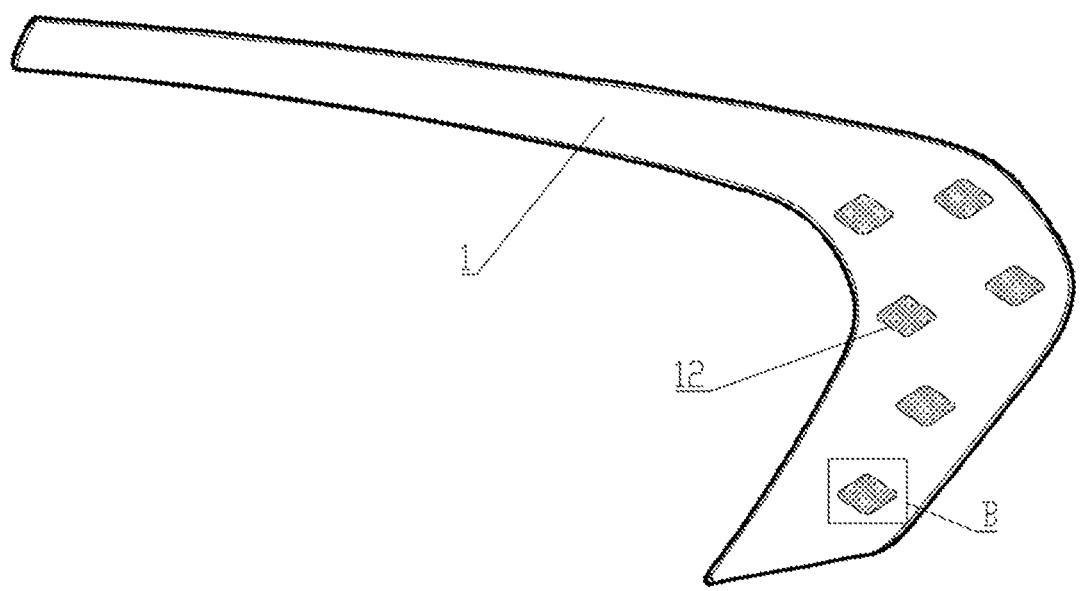
FIG. 2 is a schematic structural diagram of a trim for a vehicle provided in the present disclosure.
Figure 3:
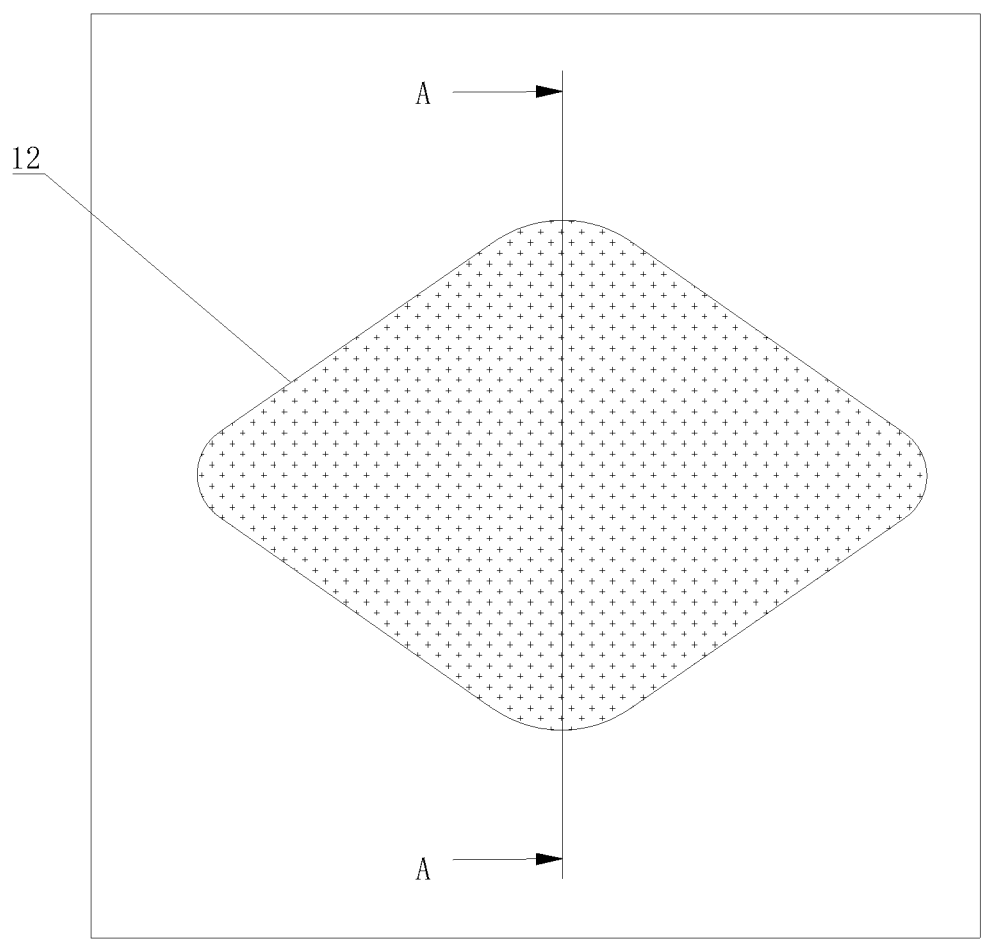
FIG. 3 is an enlarged schematic structural diagram of region B of the trim shown in FIG. 2.
Figure 4:
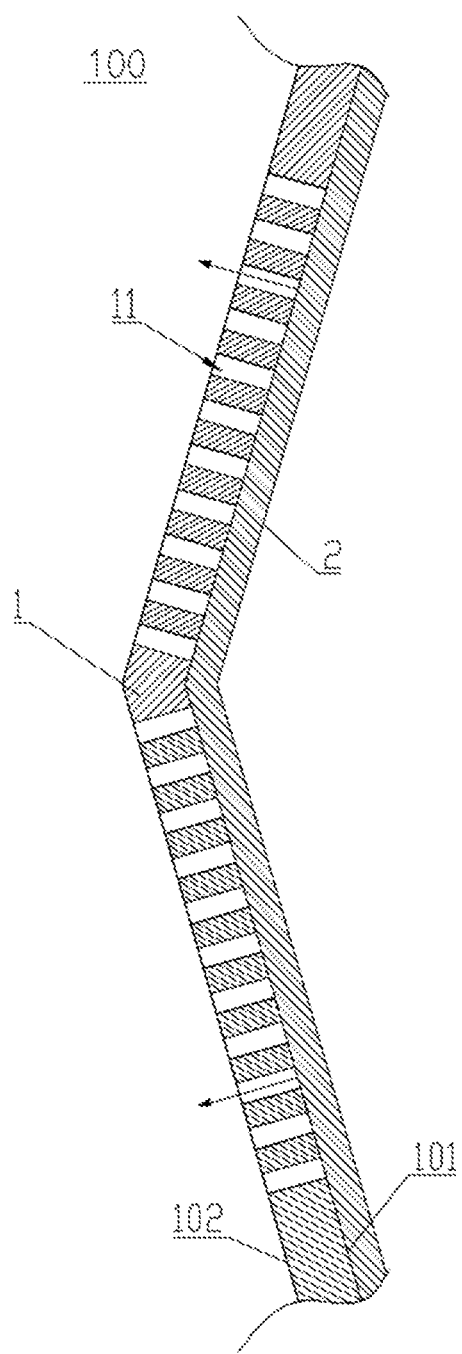
FIG. 4 is a sectional view of the trim shown in FIG. 3 along A-A.
Figure 7:
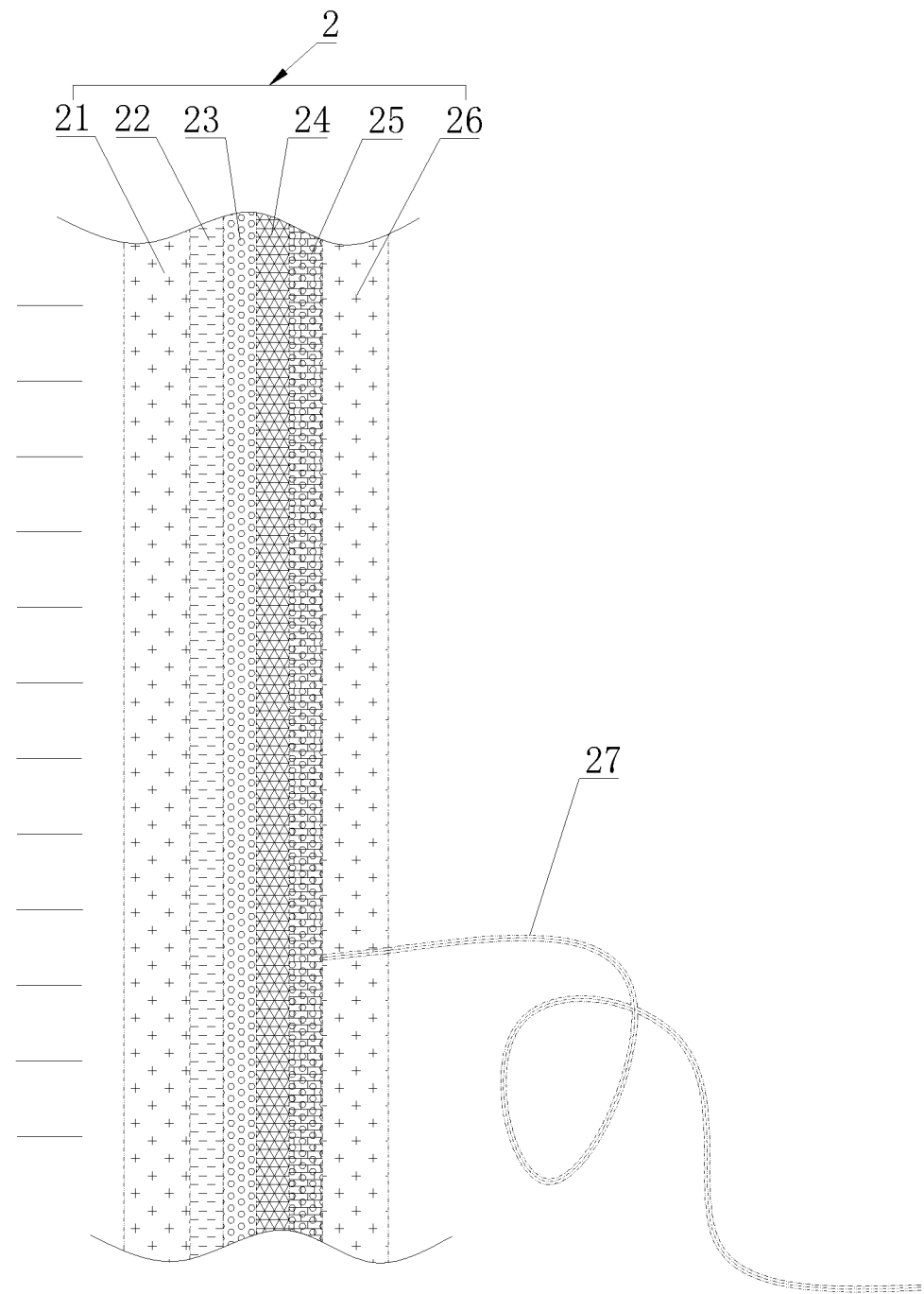
FIG. 7 is an enlarged schematic structural diagram of a flexible light emitter in the trim shown in FIG. 5.

With reference to FIG. 2 and FIG. 7, a trim 100 for a vehicle is provided in the present disclosure. The trim 100 includes a trim body 1, a flexible light emitter 2, and a light-transmitting member 3. The vehicle includes a motor vehicle, a train, an aircraft, a watercraft, etc. The trim body 1 has an inner surface 101 and an outer surface 102 opposite to the inner surface 101. The flexible light emitter 2 is attached to the inner surface 101. The trim body 1 defines multiple light-transmitting through holes 11, and the multiple light-transmitting through holes 11 extend through the inner surface 101 and the outer surface 102 and form a light-emitting region 12 on the outer surface 102. The light-transmitting member 3 is located between the trim body 1 and the flexible light emitter 2 and is configured to generate a light effect in the light-emitting region 12. The flexible light emitter 2 is configured to generate light that exits through the light-transmitting member 3 and the multiple light-transmitting through holes 11.

The operating principle of the present disclosure lies in that the flexible light emitter 2 is used to improve the fit between the flexible light emitter 2 and the inner surface 101 of the trim body 1, reducing the difficulty of production, decreasing a visible angle defined between an optical path and an axis of the light-transmitting through hole 11, and improving the light-emitting effect of the trim 100.

As can be seen from the above description, the present disclosure has the beneficial effects that according to the present disclosure, the deformable flexible light emitter 2 is used, and the flexible light emitter 2 is attached to the inner surface 101 of the trim body 1, so that the flexible light emitter 2 can be better adapted to the curvature of the inner surface 101 of the trim body 1, so as to decrease the visible angle defined between the optical path generated by the flexible light emitter 2 and the axis of the light-transmitting through hole 11, thereby improving the light-emitting effect of the trim 100, and ensuring that the light emitted by the flexible light emitter 2 can pass through the light-transmitting through holes 11, so as to allow the light-emitting effect of the light-emitting region 12 to reach an optimal state. In addition, the flexible light emitter 2 used can fit a complex curved surface and a narrow space on the inner surface 101 of the trim body 1. Compared with a flat plate-shaped light emitter, the difficulty of assembly is reduced by using the flexible light emitter 2.

Further, an outer contour of the flexible light emitter 2 is consistent with a contour of the inner surface 101. Since the flexible light emitter 2 is easy to deform, the contour of the flexible light emitter 2 can be adjusted according to the contour of the inner surface 101 of the trim body 1, so that the flexible light emitter 2 is adapted to the trim body 1, thereby decreasing the visible angle defined between the optical path generated by the flexible light emitter 2 and the axis of the light-transmitting through hole 11, and improving the light-emitting effect of the light-emitting region 12.

Further, a light guide recess 13 is defined in the inner surface 101, and the light guide recess 13 communicates with each of the multiple light-transmitting through holes 11. The light-transmitting member 3 is located in the light guide recess 13.

In this embodiment, the light guide recess 13 is defined, and the light guide recess 13 is filled with the light-transmitting member 3, so that the connection strength between the light-transmitting member 3 and the trim body 1 can be improved, and the performance of the flexible light emitter 2 can be prevented from being affected due to dust and water vapor entering the trim 100. Also, the light guide recess 13 is defined, so that the depth of the light-transmitting through hole 11 can be shortened to avoid the defect of a poor light transmission effect caused by excessive absorption of the light in the light-transmitting through holes 11 by walls of the light-transmitting through holes 11, thereby improving the light-emitting effect of the trim 100.

In an embodiment, the light-transmitting member 3 is further located in the multiple light-transmitting through holes 11. In this embodiment, the light guide recess 13 and the light-transmitting through holes 11 are both filled with the light-transmitting member 3, so that the sealing of the light-transmitting through holes 11 can be improved, and dust and water vapor can be further prevented from entering the trim 100.

Specifically, the light-transmitting member 3 includes a light-transmitting member body 31 and multiple extension portions 32 fixedly connected to the light-transmitting member body 31, the multiple extension portions 32 are arranged at intervals, and the multiple extension portions 32 correspond to the multiple light-transmitting through holes 11 on a one-to-one basis. The light-transmitting member 3 is mounted on the trim body 1, one of the multiple extension portions 32 is located in a corresponding light-transmitting through hole 11, and the light-transmitting member body 31 is located in the light guide recess 13.

In this embodiment, the light-transmitting member 3 is an ultraviolet (UV) transparent adhesive, and the light-transmitting member 3 has plasticity. In other embodiments, the light-transmitting member 3 may also be made of other transparent materials. Since the UV transparent adhesive has the advantages of aging resistance, UV resistance, good light transmission performance, etc., using the UV transparent adhesive as the light-transmitting member 3 enables the service life of the trim 100 to be prolonged, and the sealing and the light transmission performance of the trim 100 to be ensured.

Further, the ratio of the depth of the light guide recess 13 in an axial direction of the light-transmitting through hole 11 to the thickness of the trim body 1 in the axial direction of the light-transmitting through hole 11 is 1:2-0.6:1.

It can be seen from the above description that the ratio of the depth of the light guide recess 13 to the thickness of the trim body 1 is 1:2-0.6:1, that is, the ratio of the thickness of the light guide recess 13 to the length of the light-transmitting through hole 11 in a circumferential direction is 1:1-2:3, and at this ratio, the light transmission effect can be enhanced.

Further, the optical path generated by the flexible light emitter 2 is parallel to the axis of the light-transmitting through hole 11. That is to say, the light passing through the light-transmitting through hole 11 is parallel to the axis of the corresponding light-transmitting through hole 11.

It can be seen from the above description that the optical path generated by the flexible light emitter 2 is parallel to the axis of the light-transmitting through hole 11, so that the light-emitting effect reaches an optimal level, and the light emitted is softer and more even, and has a certain three-dimensional effect, compared with the related art.

Further, the multiple light-transmitting through holes 11 are evenly distributed.

It can be known from the above description that the multiple light-transmitting through holes 11 are evenly distributed, ensuring the light-emitting effect of the light-emitting region 12.

Further, the light-transmitting through hole 11 has an inner diameter of 0.5 mm-0.8 mm.

It can be known from the above description that the inner diameter is within this numerical range, so that the light transmission effect of the light-transmitting through hole 11 reaches an optimal level.

Further, the flexible light emitter 2 is bonded to the inner surface 101 of the trim body 1.

It can be seen from the above description that the flexible light emitter 2 is connected to the trim body 1 by bonding, facilitating assembly.

Further, the flexible light emitter 2 is an electroluminescent assembly. In other embodiments, the flexible light emitter 2 may also be other light-emitting assemblies.

A glass assembly (not shown) is further provided in the present disclosure. The glass assembly includes the trim 100 as described above.

Comparative Example 1

Figure 1:
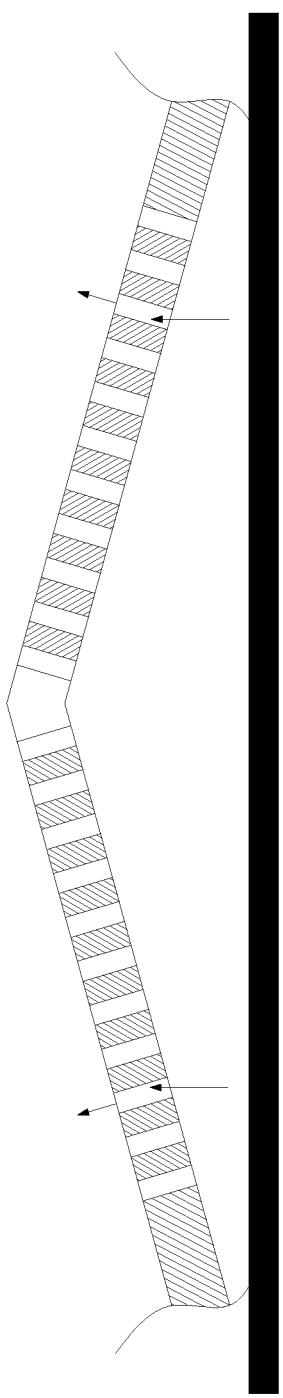
FIG. 1 is a diagram of an optical path of a trim for a vehicle in the prior art.

FIG. 1 is a diagram of an optical path of a trim in the prior art. Since a surface of the trim is usually not completely flat due to the requirements of the shape, when a light guide is used to conduct light for lighting, the trim has the defect of a poor light-emitting effect due to partial obstruction of the optical path in micro-holes.

Embodiment 1

With reference to FIG. 2-FIG. 6, a trim 100 for a vehicle includes a trim body 1, a flexible light emitter 2, and a light-transmitting member 3. The trim body 1 has an inner surface 101 and an outer surface 102. The inner surface 101 is opposite to the outer surface 102. The trim body 1 defines multiple light-transmitting through holes 11, and the multiple light-transmitting through holes 11 form a light-emitting region 12 on an outer side of the trim body 1. The flexible light emitter 2 is attached to the inner surface 101, and an outer contour of the flexible light emitter 2 is consistent with a contour of the inner surface 101. The light-transmitting member 3 is located between the trim body 1 and the flexible light emitter 2 and is configured to generate a light effect in the light-emitting region 12. The flexible light emitter 2 is configured to generate light, and the light generated by the flexible light emitter 2 exits through the light-transmitting member 3 and the light-transmitting through holes 11 and form a preset pattern in the light-emitting region 12.

Compared with comparative example 1 (as shown in FIG. 1), in this embodiment, the flexible light emitter 2 is used to improve the degree of fit between the light emitter and an inner side of the trim body 1, so as to improve the light-emitting effect and reduce the difficulty of production. In addition, the visible angle defined between the optical path generated by the flexible light emitter 2 and the axis of the light-transmitting through hole 11 is decreased, improving the light-emitting effect, and ensuring that the light emitted by the flexible light emitter 2 can pass through the light-transmitting through holes 11, so as to allow the light-emitting effect of the light-emitting region 12 to reach an optimal state.

Optionally, the trim body 1 is made of metal, such as aluminum, stainless steel, or plastic, such as polyethylene terephthalate (PET), polycarbonate (PC). In this embodiment, the trim body 1 is preferably made of the metal.

Embodiment 2

Referring to FIG. 2-FIG. 7, for the trim 100 for a vehicle, on the basis of embodiment 1, a light guide recess 13 is defined in the inner surface 101 of the trim body 1 and communicates with each of the multiple light-transmitting through holes 11. The light-transmitting member 3 has plasticity and can achieve the effect of improving the sealing. The end of the light-transmitting member 3 away from the flexible light emitter 2 is embedded in the light-transmitting through holes 11, and the end of the light-transmitting member 3 close to the flexible light emitter 2 is filled in the light guide recess 13. In order to ensure that the light-emitting effect reaches the optimal level, the light-emitting region 12 of the trim body 1 is thinned, the light-transmitting through hole 11 has an inner diameter of 0.5 mm—0.8 mm, and the light guide recess 13 is defined on an inner side of the thinned light-emitting region 12. Optionally, the ratio of the depth of the light guide recess 13 in an axial direction of the light-transmitting through hole 11 to the thickness of the trim body 1 in the axial direction of the light-transmitting through hole 11 is 1:2-0.6:1. Preferably, the ratio is 1:2.

Specifically, the light-transmitting member 3 includes a light-transmitting member body 31 and multiple extension portions 32 fixedly connected to the light-transmitting member body 31, the multiple extension portions 32 are arranged at intervals, and the multiple extension portions 32 correspond to the multiple light-transmitting through holes 11 on a one-to-one basis. The light-transmitting member 3 is mounted on the trim body 1, one of the multiple extension portions 32 is located in the corresponding light-transmitting through hole 11, and the light-transmitting member body 31 is located in the light guide recess 13.

Preferably, the light-transmitting member 3 is an UV transparent adhesive. Since corresponding light-transmitting holes or slots are defined in a surface of an exterior trim in the related art, there is a certain gap or unevenness between a light-transmitting member and the light-transmitting hole or slot, which can easily lead to accumulation of dust on the surface of the exterior trim in practical applications (dust or dirt remaining in the gaps or unevenness affects the aesthetics of the appearance). Moreover, due to the gap between the exterior trim and the light-transmitting member, it is impossible to ensure sealing and water proofing, and rainwater can easily enter the exterior trim. Even if sealing and waterproof structures are provided inside an integrated light source LED and an integrated circuit, long-term rainwater infiltration will affect the service life of electronic components.

Therefore, in this embodiment, the light-transmitting member 3 is filled in following manner. Before sealing treatment, prime-coating the light-transmitting through holes 11 with the UV transparent adhesive before curing to fill the light-transmitting through holes 11 by means of the fluidity of the UV transparent adhesive before curing, then curing the UV transparent adhesive by means of UV irradiation, then filling the light guide recess 13 with the UV transparent adhesive, and curing the UV transparent adhesive again by means of UV irradiation. The sealing and water proofing of the light-transmitting through holes 11 are improved, dust accumulation is avoided, the service life is thus prolonged, the precision of fit between the light-transmitting member 3 and the light guide recess 13 and the light-transmitting through holes 11 is improved, and the light-emitting effect is improved.

Figure 5:
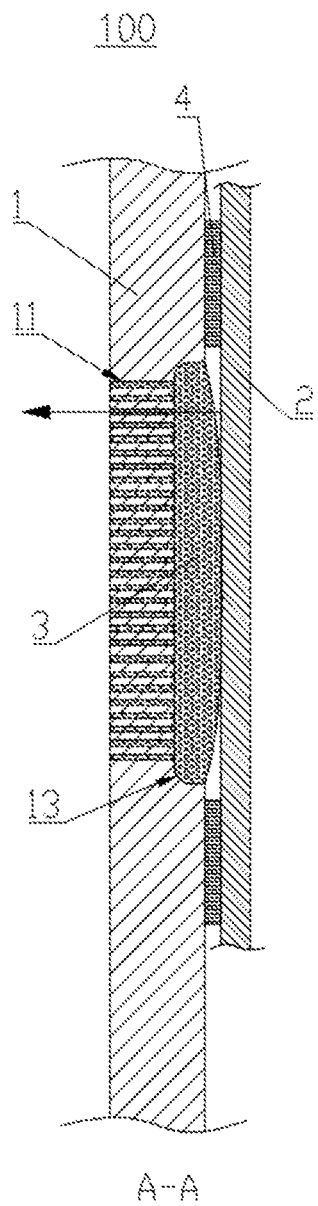
FIG. 5 is a partial enlarged schematic structural diagram of the trim shown in FIG. 4.
Figure 6:
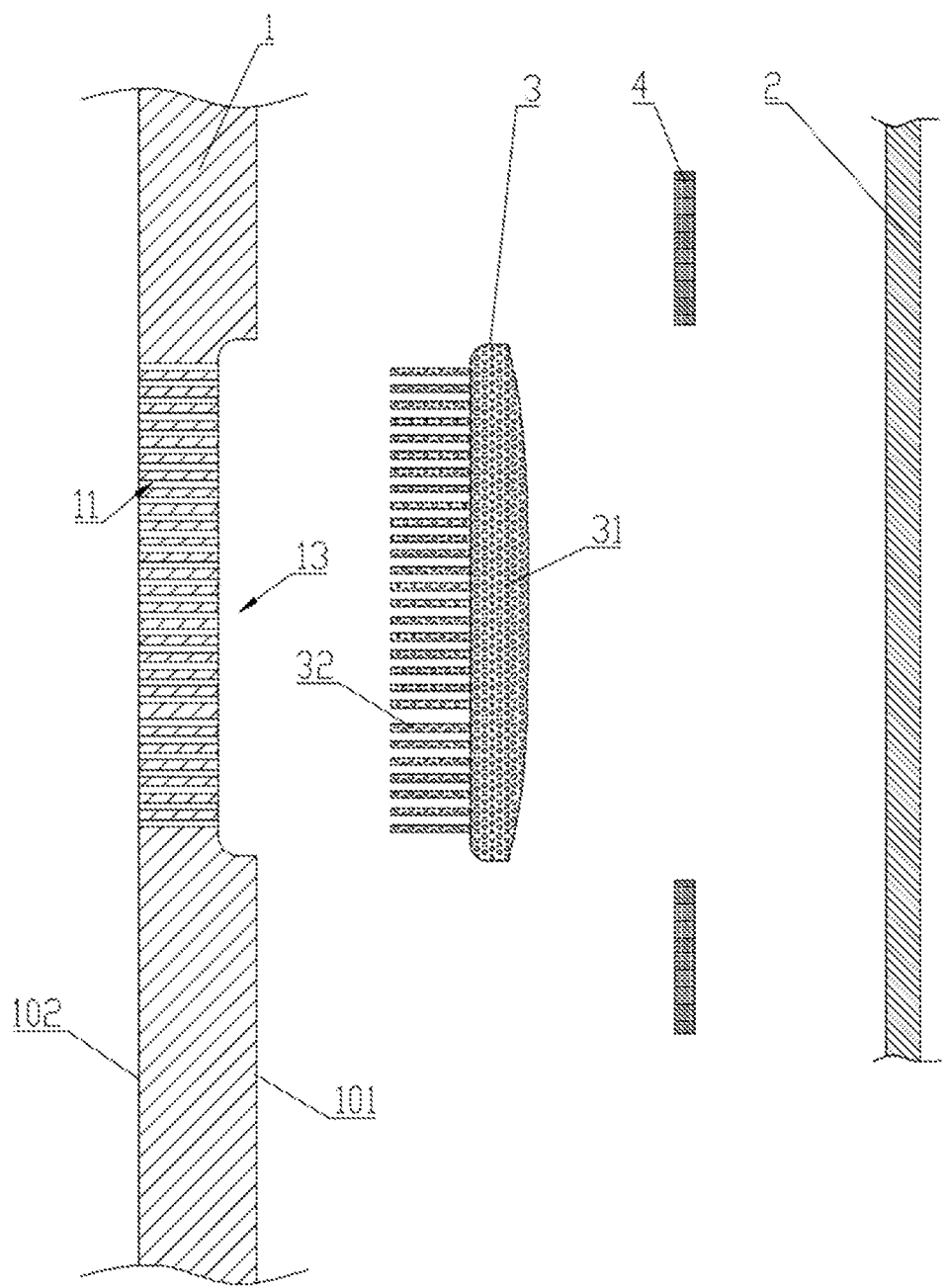
FIG. 6 is an exploded schematic structural diagram of the trim shown in FIG. 5.

Referring to FIG. 5, the optical path generated by the flexible light emitter 2 is parallel to the axis of the light-transmitting through hole 11. Since inner and outer surfaces of a metal trim of a present motor vehicle are non-flat, arranging a flat-plate-type hard light emitter on the inner side of the trim body results in a larger visible angle between the optical path and the axis of the light-transmitting through hole 11, and resulting in a poor light-emitting effect. In this embodiment, the flexible light emitter 2 is provided, and the optical path generated by the flexible light emitter 2 is parallel to the axis of the light-transmitting through hole 11, so that the loss of light during propagation is reduced, and the light-emitting effect can be thus ensured.

Preferably, the multiple light-transmitting through holes 11 are evenly distributed, so that the light emitted by the light-emitting region 12 are more even.

Referring to FIG. 5, the flexible light emitter 2 is bonded to the inner surface 101 of the trim body 1. Specifically, the flexible light emitter 2 is bonded to the inner surface 101 of the trim body 1 by an adhesive 4. Preferably, the adhesive 4 is a 3M™ adhesive. In other embodiments, the adhesive 4 may also be other adhesives, as long as it can fixedly connect the flexible light emitter 2 to the trim body 1.

Optionally, the flexible light emitter 2 is an electroluminescent assembly or a light-emitting diode (LED) panel; and the flexible light emitter 2 is preferably an electroluminescent assembly.

Referring to FIG. 7, when the flexible light emitter 2 is the electroluminescent assembly, the flexible light emitter 2 includes a first PET protective layer 21, a transparent conductive layer 22, a light-emitting layer 23, an insulating layer 24, a conductive dielectric layer 25, and a second PET protective layer 26. The first PET protective layer 21, the transparent conductive layer 22, the light-emitting layer 23, the insulating layer 24, the conductive dielectric layer 25, and the second PET protective layer 26 are stacked in sequence. The first PET protective layer 21 is arranged facing the trim body 1. The conductive dielectric layer 25 is configured to be electrically connected to an external power source by means of a cable 27. Preferably, the flexible light emitter 2 is integrally packaged and formed. In this embodiment, since the electroluminescent assembly is integrally packaged and formed by stacking multiple layers of materials, the electroluminescent assembly has a good flexibility and can be closely attached to the trim body 1, so that the light emitted by the light-emitting layer 23 pass through the transparent conductive layer 22 and the first PET protective layer 21 in sequence and then enter the light-transmitting through holes 11, and the light emitted is softer and has a certain three-dimensional effect.

Embodiment 3

A glass assembly includes a trim 100 as described in embodiment 1 and embodiment 2.

The glass assembly in this embodiment further includes a glass pane and an encapsulation surrounding the glass pane. The trim 100 is mounted on the encapsulation.

The trim 100 in the present disclosure is preferably arranged on a glass assembly at a quarter window, but it is readily understood that in other embodiments of the present disclosure, the trim 100 may also be applied on an A-pillar, a B-pillar, a C-pillar of a motor vehicle, etc., or may be applied on any position of the exterior trim (such as a luggage rack, a waistline, and a door frame molding) of the motor vehicle. As a preferred embodiment, the present disclosure may also be applied on an interior trim of the vehicle.

In summary, the trim 100 for a vehicle is provided in the present disclosure. The multiple evenly distributed light-transmitting through holes 11 are defined to form the light-emitting region 12 on the surface of the trim body 1, and the flexible electroluminescent assembly is used and better conforms to the curved surface of the inner surface 101 of the trim body 1, so that the difficulty of assembly is reduced, the light generated in the light-emitting region 12 is softer and more even and has a good three-dimensional effect, and the sensory experience of a user is improved. Furthermore, the light-transmitting member 3 is the UV transparent adhesive, and after filling the light-transmitting through holes 11 and the light guide recess 13 in a liquid state, the UV transparent adhesive is cured by means of UV irradiation, so that the sealing of the light-transmitting through holes 11 is improved while the light-emitting effect is ensured, thereby providing waterproof.

The description above merely relates to the embodiments of the present disclosure, and is not intended to limit the scope of the present disclosure. Any equivalent transformation made by using the contents of the description and drawings of the present disclosure, or any direct or indirect application of the contents of the description and drawings of the present disclosure in the related technical fields, is equally included in the scope of protection of the present disclosure.

What is claimed is:

1. A trim for a vehicle, comprising a trim body, a flexible light emitter, and a light-transmitting member, wherein
   the trim body has an inner surface and an outer surface opposite to the inner surface, and the flexible light emitter is attached to the inner surface;
   the trim body defines a plurality of light-transmitting through holes, and the plurality of light-transmitting through holes extend through the inner surface and the outer surface and form a light-emitting region on the outer surface;
   the light-transmitting member is located between the light-emitting region and the flexible light emitter;
   the flexible light emitter is configured to generate light that exits through the light-transmitting member and the plurality of light-transmitting through holes;
   a light guide recess is defined in the inner surface, and the light guide recess communicates with each of the plurality of light-transmitting through holes; and the light-transmitting member is located in the light guide recess; and
   a ratio of a depth of the light guide recess in an axial direction of each of the plurality of light-transmitting through holes to a thickness of the trim body in the axial direction of each of the plurality of light-transmitting through holes is 1:2-0.6:1.

2. The trim for a vehicle according to claim 1, wherein an outer contour of the flexible light emitter is consistent with a contour of the inner surface.

3. The trim for a vehicle according to claim 1, wherein the flexible light emitter is bonded to the inner surface of the trim body.

4. The trim for a vehicle according to claim 1, wherein the light-transmitting member is further located in the plurality of light-transmitting through holes.

5. The trim for a vehicle according to claim 4, wherein the light-transmitting member comprises a light-transmitting member body and a plurality of extension portions fixedly connected to the light-transmitting member body, the plurality of extension portions are arranged at intervals, and the plurality of extension portions correspond to the plurality of light-transmitting through holes on a one-to-one basis; and the light-transmitting member is mounted on the trim body, one of the plurality of extension portions is located in a corresponding light-transmitting through hole, and the light-transmitting member body is located in the light guide recess.

6. The trim for a vehicle according to claim 1, wherein each of the plurality of light-transmitting through holes has an inner diameter of 0.1 mm-0.8 mm.

7. The trim for a vehicle according to claim 1, wherein the outer surface of the trim body is perpendicular to an axis of each of the plurality of light-transmitting through holes, and the light passing through each of the plurality of light-transmitting through holes is parallel to an axis of a corresponding light-transmitting through hole.

8. The trim for a vehicle according to claim 1, wherein the plurality of light-transmitting through holes are evenly distributed.

9. The trim for a vehicle according to claim 1, wherein the flexible light emitter is an electroluminescent assembly.

10. The trim for a vehicle according to claim 9, wherein the flexible light emitter comprises a first polyethylene terephthalate (PET) protective layer, a transparent conductive layer, a light-emitting layer, an insulating layer, a conductive dielectric layer, and a second PET protective layer that are stacked in sequence, the first PET protective layer is arranged facing the trim body, and the conductive dielectric layer is configured to be electrically connected to an external power source by means of a cable.

11. The trim for a vehicle according to claim 1, wherein the light-transmitting member is an ultraviolet (UV) transparent adhesive.

12. The trim for a vehicle according to claim 11, wherein the flexible light emitter is integrally packaged and formed.

13. A glass assembly, comprising a trim, wherein the trim is for a vehicle and comprises a trim body, a flexible light emitter, and a light-transmitting member, wherein the trim body has an inner surface and an outer surface opposite to the inner surface, and the flexible light emitter is attached to the inner surface;

the trim body defines a plurality of light-transmitting through holes, and the plurality of light-transmitting through holes extend through the inner surface and the outer surface and form a light-emitting region on the outer surface;

the light-transmitting member is located between the light-emitting region and the flexible light emitter;

the flexible light emitter is configured to generate light that exits through the light-transmitting member and the plurality of light-transmitting through holes;

a light guide recess is defined in the inner surface, and the light guide recess communicates with each of the plurality of light-transmitting through holes; and the light-transmitting member is located in the light guide recess; and a ratio of a depth of the light guide recess in an axial direction of each of the plurality of light-transmitting through holes to a thickness of the trim body in the axial direction of each of the plurality of light-transmitting through holes is 1:2-0.6:1.

14. The glass assembly according to claim 13, wherein an outer contour of the flexible light emitter is consistent with a contour of the inner surface.

15. The glass assembly according to claim 13, wherein the light-transmitting member is further located in the plurality of light-transmitting through holes.

16. The glass assembly according to claim 15, wherein the light-transmitting member comprises a light-transmitting member body and a plurality of extension portions fixedly connected to the light-transmitting member body, the plurality of extension portions are arranged at intervals, and the plurality of extension portions correspond to the plurality of light-transmitting through holes on a one-to-one basis; and the light-transmitting member is mounted on the trim body, one of the plurality of extension portions is located in a corresponding light-transmitting through hole, and the light-transmitting member body is located in the light guide recess.

* * * * *